United States Patent [19]

Mukae et al.

[11] Patent Number: 5,537,276
[45] Date of Patent: Jul. 16, 1996

[54] MAGNETIC HEAD INSTALLED ON A ROTARY DRUM AND METHOD FOR ADJUSTING THE HEAD HEIGHT

[75] Inventors: Hideaki Mukae, Sanda; Masaru Higashionji, Katano; Akio Murata, Ibaraki; Takaaki Maegawa, Neyagawa, all of Japan

[73] Assignee: Matsushita Electric Industrial Co., Ltd., Osaka-fu, Japan

[21] Appl. No.: 430,307

[22] Filed: Apr. 28, 1995

Related U.S. Application Data

[63] Continuation of Ser. No. 231,454, Apr. 20, 1994, abandoned, which is a continuation of Ser. No. 865,893, Apr. 8, 1992, abandoned.

[30] Foreign Application Priority Data

Apr. 9, 1991 [JP] Japan .................. 3-076237
Apr. 17, 1991 [JP] Japan .................. 3-085047

[51] Int. Cl.⁶ .................. G11B 5/56; G11B 21/02
[52] U.S. Cl. .................. 360/109; 360/75
[58] Field of Search .................. 360/77.16, 107, 360/109, 105, 75; 219/121.85, 121.69, 121.68

[56] References Cited

U.S. PATENT DOCUMENTS

| | | | |
|---|---|---|---|
| 4,203,140 | 5/1980 | Watanabe | 360/77.16 |
| 4,814,908 | 3/1989 | Schmitz | 360/109 |
| 5,065,267 | 11/1991 | Yohda | 360/121 |
| 5,099,373 | 3/1992 | Shibata et al. | 360/104 |
| 5,256,850 | 10/1993 | Maegawa et al. | 360/109 |
| 5,303,108 | 4/1994 | Higashionji et al. | 360/107 |
| 5,341,256 | 8/1994 | Murata et al. | 360/109 |
| 5,347,415 | 9/1994 | Murata et al. | 360/109 |

FOREIGN PATENT DOCUMENTS

| | | | |
|---|---|---|---|
| 59-165233 | 9/1984 | Japan | 360/109 |
| 59-203272 | 11/1984 | Japan | 360/77.16 |
| 61-189463 | 11/1986 | Japan . | |
| 62-93028 | 4/1987 | Japan . | |
| 62-134118 | 6/1987 | Japan . | |
| 1-227279 | 9/1989 | Japan . | |

OTHER PUBLICATIONS

Proceedings of LAMP '87, Osaka (May, 1987), "Laser Forming of Metals and Alloys" Yoshihara Namba, pp. 601–606.

Rikohgaku-sha, "Welding Engineering", First Edition, May 11, 1989, with summary and translation of pp. 80–84.

*Primary Examiner*—A. Jo Heinz
*Assistant Examiner*—Brian E. Miller
*Attorney, Agent, or Firm*—Wenderoth, Lind & Ponack

[57] ABSTRACT

A head height adjustment method is for adjusting the height of a magnetic head chip fixed to a free end of an elongated head base extending from a rotary drum. The elongated head base has an intermediate portion bent at first and second restricted areas. A laser beam is emitted on one surface of the elongated head base for bending the elongated head base at the first restricted area to enfold along the first restricted area. Another laser beam is emitted on another surface of the elongated head base, off alignment from said first restricted area, for bending the elongated head base at the second restricted area to enfold along the second restricted area. Thus, opposite end portions of the elongated head base extend parallel to each other, but at different levels.

2 Claims, 6 Drawing Sheets

MAGNETIC HEAD INSTALLED ON A ROTARY DRUM AND METHOD FOR ADJUSTING THE HEAD HEIGHT

This application is a Continuation of now abandoned application, Ser. No. 08/231,454, filed Apr. 20, 1994, which is a Continuation of now abandoned application, Ser. No. 07/865,893, filed Apr. 8, 1992.

BACKGROUND OF THE INVENTION

1. Field of the Invention

The present invention relates to a magnetic head installed drum for use in a magnetic recording/reproducing device such as a video cassette recorder (VCR), and also to a method for adjusting the position of a rotary head mounted in the magnetic recording/reproducing device.

2. Description of the Prior Art

As shown in FIGS. 1 and 2, high quality consumer VCR decks today have plural rotary heads 1 provided on a rotary drum 3 for recording video and hi-fi audio signals onto the tape, and for erasing recorded tracks. Each of the rotary heads 1 is attached to a metal base called the head base 2, and the head bases 2 are mounted on the rotary drum 3. Each of the rotary heads 1 must be precisely positioned on the rotary drum 3 in order to maintain the integrity of the tape format because the position of the tracks recorded to the tape is primarily determined by the position of the heads on the rotary drum 3.

The position of the heads is defined by the absolute head height Ha, the relative head height Hr, and the azimuth angle 7 of the head gap. The absolute head height Ha is the distance from the reference surface 6 of the fixed drum 4 and the track edge 5 of the head 1, and the relative head height Hr is the distance between the track edge of the different heads.

The head height has conventionally been adjusted as follows.

Consumer VCR decks do not typically have a mechanism for adjusting the azimuth angle 7, and the azimuth angle 7 is therefore adjusted when the heads are manufactured by cutting a gapped bar into chips. The precision of the azimuth angle 7 is therefore determined by the mechanical precision of the cutting process, and by the precision of the process by which the head is attached to the head base 2 with an adhesive 8.

To adjust the head height, the distance H0 is first measured for each head from the surface of the head base 2 to which the rotary heads 1 are attached to the track edge 5 of the heads. The absolute height of each head is then roughly adjusted for the distance from the head base 2 surface to the track edge 5 of the head by inserting metal plates 9 called "shims" according to the amount of adjustment required. Each of the heads is then secured to the rotary drum 3 with a screw 10.

The rotary drum 3 is mounted to the fixed drum 4 after the heads are mounted to the rotary drum 3, and the absolute height and relative height of each head is then precisely adjusted using the screw 11 contacting the head base 2 as shown in FIG. 2.

Elastic deformation of the head base 2 caused by loosening or tightening the screw 11 causes the rotary head 1 mounted on the head base 2 to move vertically in head height direction B (parallel to the shaft 12 of the rotary drum 3), and makes it possible to precisely control both the absolute head height Ha and the relative head height Hr. In practice, however, differences in the shape of the screw 11 tip and the translation of one full turn of the screw 11 into a 500 μm change in the head height makes it very difficult to achieve submicron adjustments in the head height.

Furthermore, the simple adjustment described above depends upon the mechanical deformation of the head base 2 caused by the pressure of the screw 11 against and within the limits of the elastic deformation of the head base 2. As a result, when the drum unit is subject to mechanical vibrations and changes in the ambient environment, the screw 11 pressing against the head base 2 tends to be loosened, resulting in a change in the head height.

Studies conducted by the inventors have shown that the relative head height can change approximately two microns in vibration tests and in heat cycle tests in which the temperature is varied between −40° C. and +80° C.

A change in the head height of such magnitude results in a significant deterioration in the quality of the playback image, particularly during the extended play mode, which in the VHS format is a narrow track six-hour playback mode. Technically, a change in the head height of this degree is a cause of tracking error, reduced playback voltage, and increased crosstalk from adjacent tracks.

In addition, the rotary head 1 to tape angle can be greatly increased if the screw 11 depressing the head base 2 is screwed in too far as shown in FIG. 3. This results in poor contact between the tape and head during both recording and playback and lowers the playback output level. As a result, the effective adjustment range using the screw 11 has been five microns.

SUMMARY OF THE INVENTION

Therefore, an object of the present invention is to provide a magnetic head installed drum for use in a magnetic recording/reproducing device and also a method for adjusting the head height with high precision without changing the angle of the head chip and with the head height being thereafter unaffected by vibrations and changes in temperature.

The present invention adjusts the head height of a magnetic head comprising a head base and head chip attached to the head base by using the angular distortion of the head base resulting from emission of a laser beam to the head chip mounting area of the head base both on the side of the magnetic head to which the head chip is not attached and to the side of the magnetic head to which the head chip is attached.

Specifically, by emitting the laser beam to both surfaces of the head base at the mounting area of the head chip head being adjusted, the head height can be adjusted without changing the angle of the head chip. This method can be applied to the head base alone with the head chip simply attached thereto, or with the head base completely mounted to the rotary drum. When this method is applied with the head base assembled on the rotary drum, the head height can be easily adjusted by providing a penetration hole for passage of the laser beam in the rotary drum and the fixed drum.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
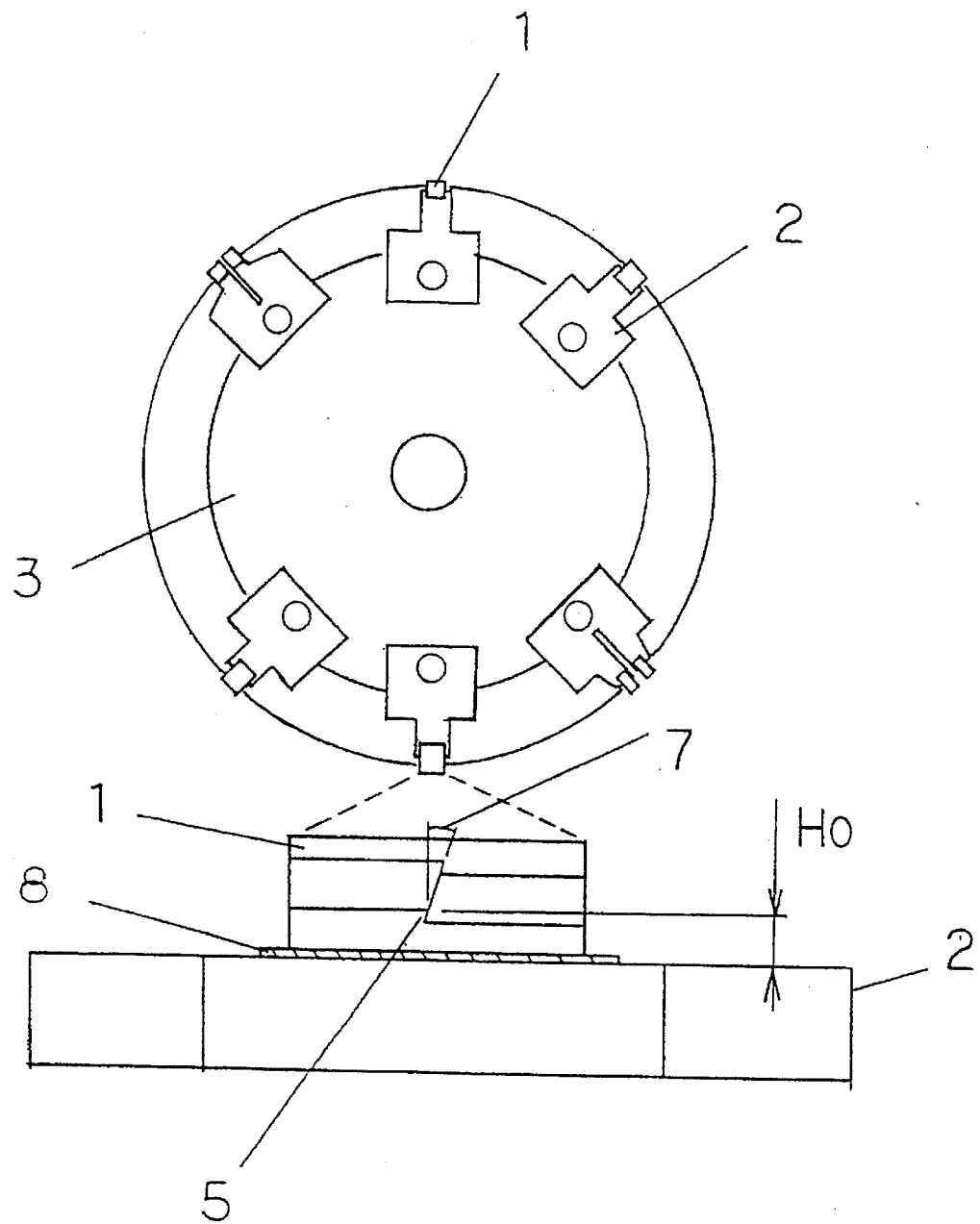
FIGS. 1 and 2 are figures used to describe the prior art, FIG. 1 being an enlarged view showing the bottom of the rotary drum on which the rotary heads are mounted and the head gap, and FIG. 2 being a side view of the drum unit in which the rotary drum is mounted to the fixed drum.
Figure 2:
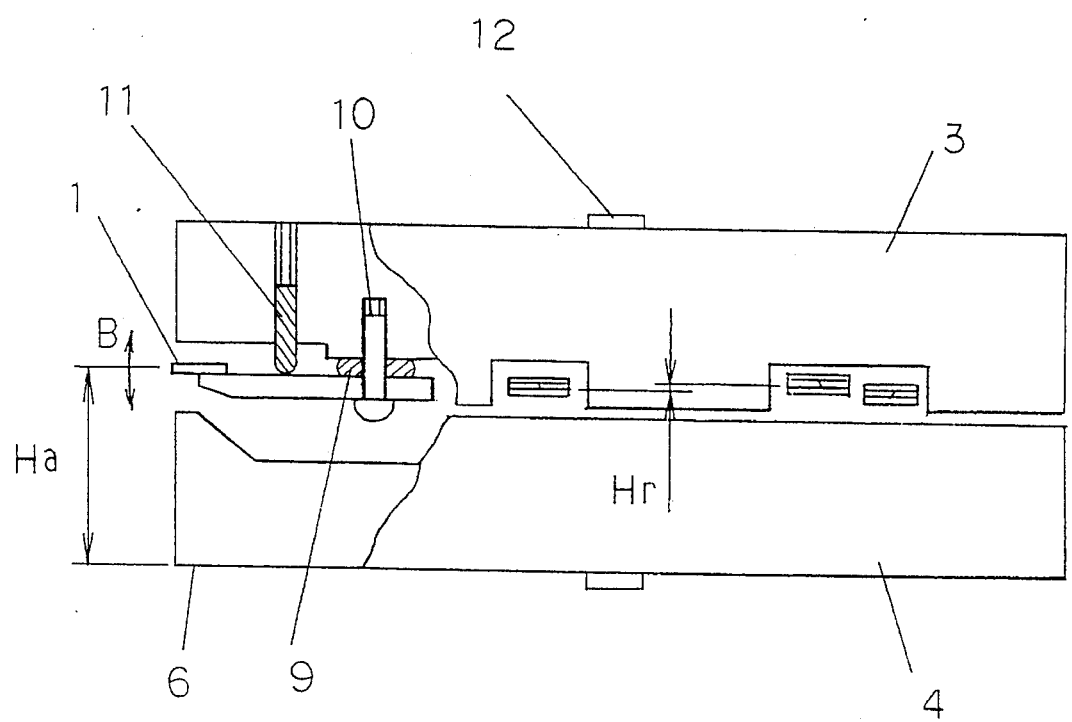
Figure 3:
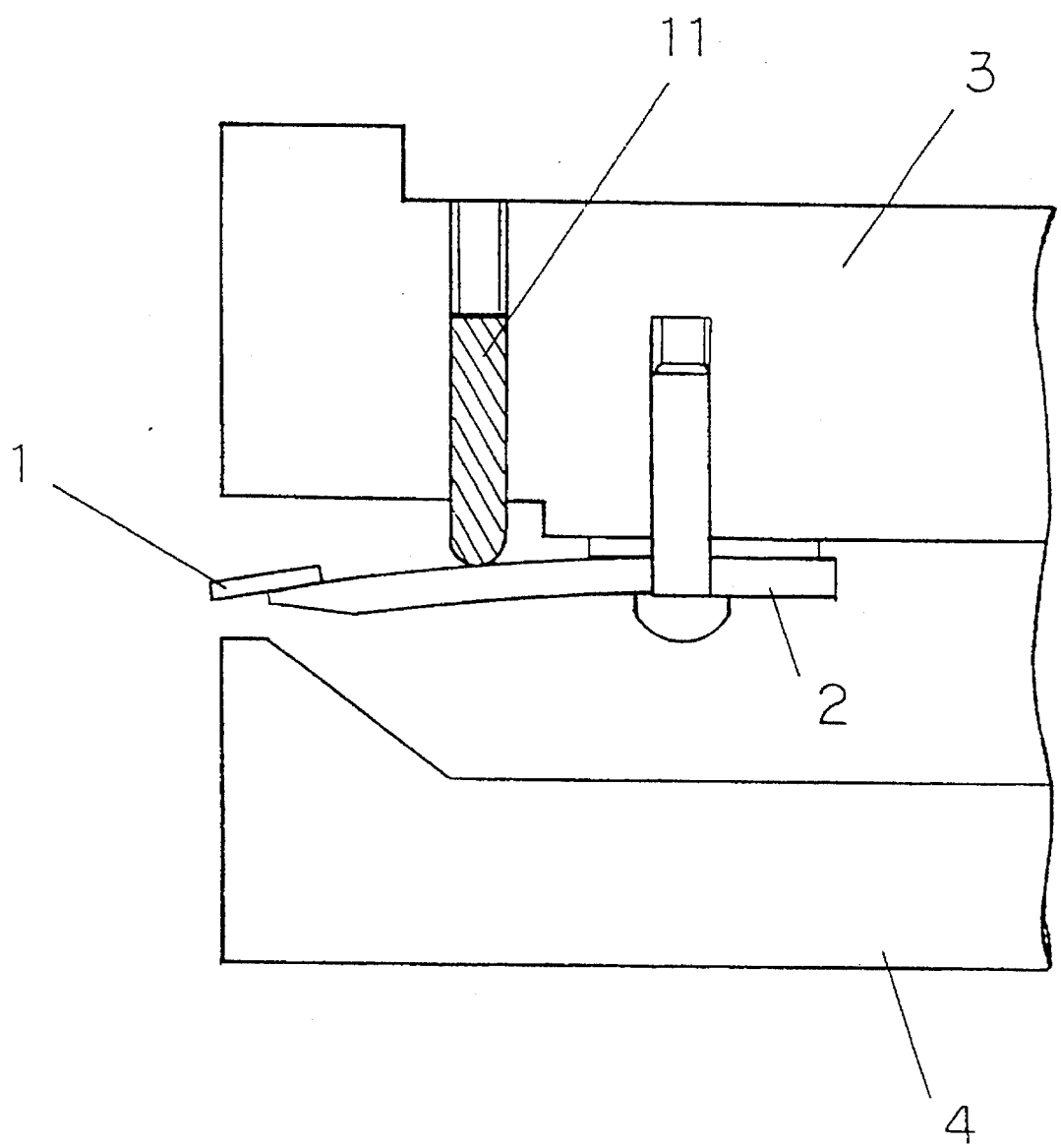
FIG. 3 is an enlarged view of the essential parts of the prior art shown in FIG. 2.
Figure 4A:
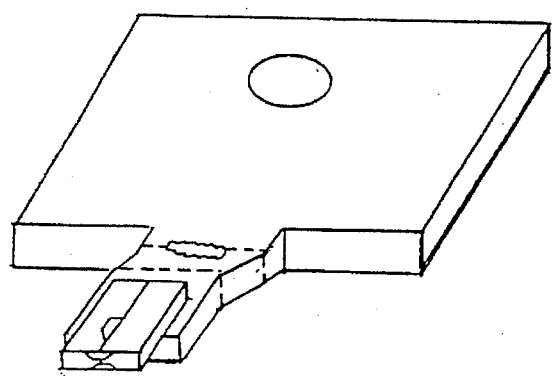
FIG. 4(a) is an oblique view of a magnetic head for which the head height is adjusted by the method of the present invention.
Figure 4B:
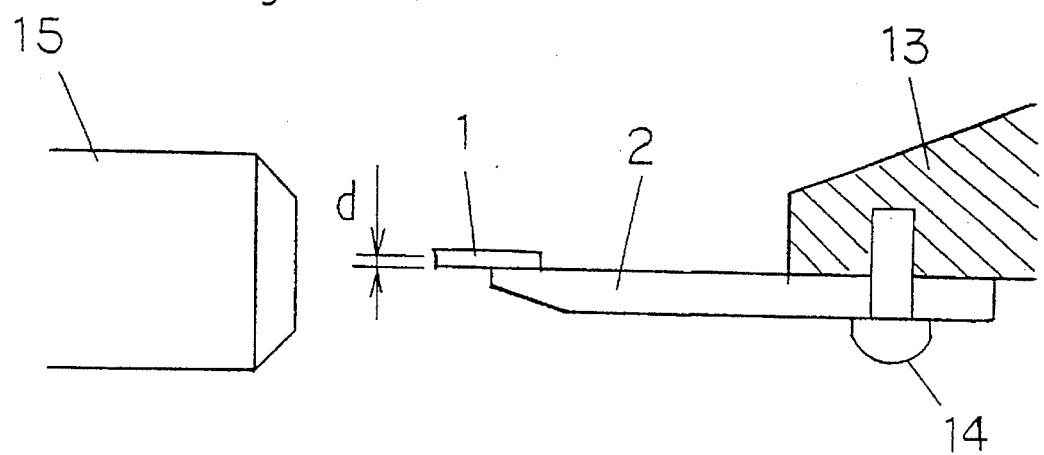
FIGS. 4(b) and 4(c) are enlarged cross-sectional views of FIG. 4(a) used to describe the invention.
Figure 4C:
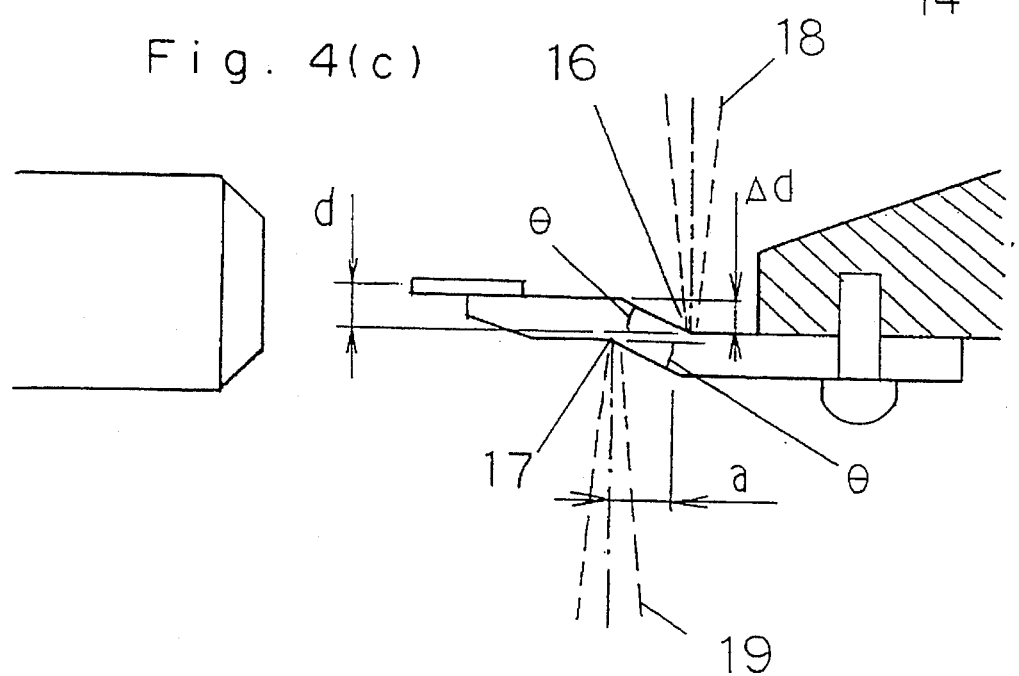

The preferred embodiment of the present invention is shown in FIGS. 4(a), 4(b) and 4(c), of which FIG. 4(a) is an oblique view of the magnetic head after head height adjustment, and FIGS. 4(b) and 4(c) are used to describe the method of adjustment.

First, a 1.5 mm thick brass head base 2 to which the rotary head chip 1 has been applied is mounted to the reference block 13 by a screw 14. The height d of the head chip 1 from the reference block 13 is then measured using the objective lens 15. In this example it is assumed that the measured height d is 45.3 µm. If the required height d is 60 µm, it is therefore necessary to bend the head base 2 toward the reference block 13 by an amount equal to the difference between the measured and required heights, i.e., 14.7 µm in this example.

As shown in FIG. 4(c), deformation by laser beam emission causes the head base 2 to deform towards the side to which the laser beam is emitted due to angular distortion resulting from plastic deformation and/or heat shrinkage in the area exposed to the laser beam. In other words, if the amount of required height adjustment is Δd and the emission gap from both sides of the head base is a, the relationship to the amount of angular distortion θ (in radians) is defined by the equation:

$$\Delta d = a * \sin\theta \quad (1)$$

From equation (1) it is known that the required amount of angular distortion is 14.7 milliradians in the present embodiment because Δd is 14.7 µm and the emission gap is 1 mm.

It should be noted that a YAG pulse laser (1.06 µm wavelength) is used in this description to generate the laser beam with the output energy adjusted to 4 joules/pulse. Furthermore, it is empirically found that when this pulse laser is emitted to the area around the head chip 1 of the brass head base 2, there is a resulting angular distortion of 1 milliradian per pulse.

Because there is an additive increase in the angular distortion with this method, the present embodiment achieves the total required angular distortion by controlling the total number of pulses emitted by the laser beam.

As shown in FIG. 4 (c), the pulse laser 18 is first emitted fifteen times to a position 16 five millimeters from the tip of the chip and on the same side of the head base 2 as that on which the head chip 1 is mounted. Another pulse laser 19 is then emitted to the opposite side of the head base 2 at a position 17 one millimeter closer to the chip. In this manner, two corresponding thermoplastic deformations are formed.

As a result of adjusting the head height by means of angular distortion as described above, the final head height is 60.5 µm, an offset of 0.5 µm from the required height, which is within the tolerance. This demonstrates that an adjustment of more than 5 µm, the maximum adjustment possible with the prior art without biasing the head chip to the tape, is possible. After a repeated heat cycle test exposing the head unit to ten hour cycles ranging from –40° C. to +80° C., the change in the head height was less than 0.1 µm, demonstrating that the head height adjustment method according to the present invention provides extremely high reliability.

Figure 5:
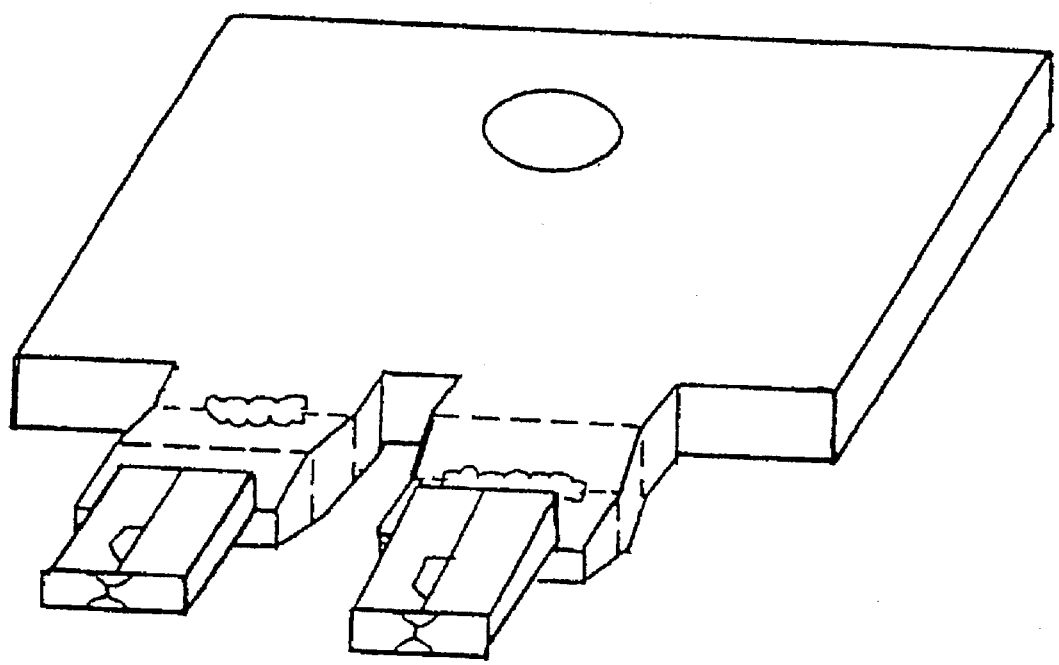
FIG. 5 is an oblique view of a magnetic head to which two head chips are mounted and the height of each of which is adjusted by the method of the present invention.

It is to be noted that while the present invention has been described with application to a single head chip mounted on the head base, the same adjustment can be performed with multiple head chips mounted on a single head base as shown in FIG. 5. Furthermore, the precision and reliability of the height adjustment according to this method shall not be limited by the order of emissions to the head base, the number of emissions, or the emission gap.

Figure 6:
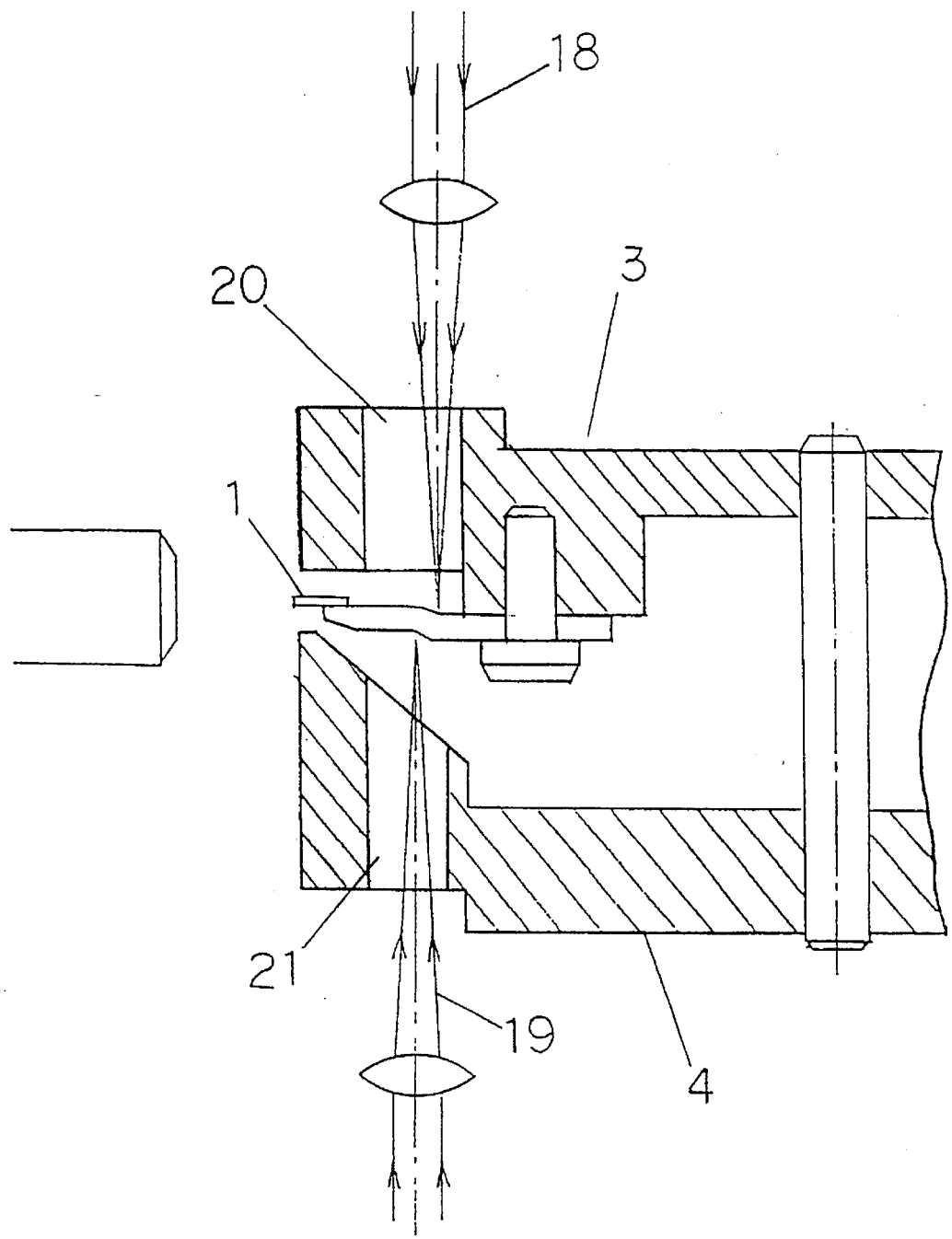
FIG. 6 is a cross-sectional view of the height adjustment when the magnetic heads are mounted on the rotary drum and assembled in the drum unit.

In addition, while the head base was mounted to a reference block to adjust the height in the preferred embodiment described above, the height can be similarly adjusted, as shown in FIG. 6, after mounting the rotary heads 1 to the rotary drum 3 and mounting the rotary drum 3 to the fixed drum 4 by providing penetration holes 20 and 21 in the rotary drum 3 and the fixed drum 4, and emitting the laser beams 18 and 19 through these holes to similarly adjust the height.

Moreover, adjustment of head base distortion was controlled in the above embodiment by adjusting the number of emitted laser beam pulses, but other control methods, including laser power control, can also be used with equal effectiveness. Additionally, it should be noted that the equivalent adjustment can be obtained when the dimensions and material of the head base are changed by simply adjusting the laser beam emission conditions accordingly.

Finally, the present embodiment utilizes weld distortion resulting from light energy applied by laser beam emissions, but in principle any method capable of applying local heating can also be used. These alternative methods include, for example, arc welding and electron beam welding using electrical energy, supersonic welding using ultrasonic wave energy, and gas welding using chemical energy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic head installed drum unit for use in a magnetic recording/reproducing device, comprising:

a rotary drum having a first open through hole defining an axis therethrough;

a fixed drum coaxially located adjacent said rotary drum and having a second open through hole defining an axis therethrough;

a head chip having a gap for writing/reading data on a magnetic recording medium which moves past said head chip by contacting said magnetic recording medium; and an elongate head base extending lengthwise between said first open through hole of said rotary drum and said second open through hole of said fixed drum and having a first end fixed to said rotary drum and a second end holding said head chip, said elongate head base further having spaced apart, along a length thereof, first and second plastic deformations intermediate said first and second ends, said first plastic deformation being located at a position in alignment with said axis of said first open through hole, and said second plastic deformation being located at a position in alignment with said axis of said second open through hole, wherein a first horizontal length of said elongate head base between said first end and said first plastic deformation and a second horizontal length of said elongate plate between said second end and said second plastic deformation extend normal to a rotary axis of said rotary drum and parallel to each other at different vertical levels, said first and second plastic deformations having been thermally formed by exposure to laser beams through said first and second open through holes on opposite surfaces of said elongate head base so as to plastically deform said elongate head base at positions on said opposite surfaces exposed to said laser beams.

2. A head height adjustment method for adjusting the height of a magnetic head chip fixed to a free end of an elongate head base extending from a rotary drum, comprising the steps of:

emitting heat energy at a first position on one of a top surface and a bottom surface of said elongate head base for thermoplastically deforming said elongate head base at said first position to bend said elongate head base at said first position;

emitting heat energy at a second position, spaced from said first position in a direction from said free end, on the other one of said top surface and said bottom surface of said elongate head base for thermoplastically deforming said elongate head base at said second position to bend said elongate head base at said second position such that opposite horizontal end portions of said elongate head base extend normal to a rotary axis of said rotary drum and parallel to each other at different vertical levels.

* * * * *